(12) United States Patent
Weng et al.

(10) Patent No.: US 7,110,248 B2
(45) Date of Patent: Sep. 19, 2006

(54) NOTEBOOK COMPUTER HAVING A ROTATABLE DISPLAY MODULE

(75) Inventors: Shih-Lung Weng, Kaohsiung (TW); Tang Lung Hsu, Taipei (TW)

(73) Assignee: Benq Corporation, Taoyuan Shien (TW)

( * ) Notice: Subject to any disclaimer, the term of this patent is extended or adjusted under 35 U.S.C. 154(b) by 115 days.

(21) Appl. No.: 10/812,331

(22) Filed: Mar. 29, 2004

(65) Prior Publication Data

US 2004/0201954 A1    Oct. 14, 2004

(30) Foreign Application Priority Data

Apr. 10, 2003   (TW)   .............................. 92108286 A

(51) Int. Cl.
  *H05K 5/00*   (2006.01)
  *G06F 1/16*   (2006.01)
(52) U.S. Cl. .................................................... 361/681
(58) Field of Classification Search ................ 361/681, 361/682, 683, 685; 349/58; D14/300, 316, D14/377, 378, 379; 248/917–924; 312/223.1–223.2; 439/131, 13
See application file for complete search history.

(56) References Cited

U.S. PATENT DOCUMENTS

| | | | |
|---|---|---|---|
| 6,404,623 B1* | 6/2002 | Koshika | 361/681 |
| 6,744,623 B1* | 6/2004 | Numano et al. | 361/681 |
| 2005/0141181 A1* | 6/2005 | Stephany et al. | 361/681 |
| 2005/0153668 A1* | 7/2005 | Lee | 455/90.3 |

* cited by examiner

*Primary Examiner*—Lynn Feild
*Assistant Examiner*—Ingrid Wright
(74) *Attorney, Agent, or Firm*—Thomas, Kayden, Horstemeyer & Risley

(57) ABSTRACT

A notebook computer having a rotatable display module is provided. A first housing includes a sunken part having an inner front wall and an inner side wall. A second housing having a front panel and a protrusion is disposed at one side of the first housing and is able to rotate forward and backward between a first position and a second position. A guide track is formed on the inner side wall. When the second housing is rotated, the protrusion moves forward and backward between a first fixer and a second fixer along the guide track. When the protrusion is held by the first fixer or the second fixer, the second housing is located at the first position or the second position. The second housing is driven to rotate to the first position by an elastic device while the protrusion is departed from the second fixer.

22 Claims, 14 Drawing Sheets

NOTEBOOK COMPUTER HAVING A
ROTATABLE DISPLAY MODULE

This application claims the benefit of Taiwan application Serial No. 092108286, filed Apr. 10, 2003, the subject matter of which is incorporated herein by reference.

BACKGROUND OF THE INVENTION

1. Field of the Invention

The invention relates in general to a notebook, and more particularly to a notebook computer having a rotatable display module.

2. Description of the Related Art

Referring to FIG. 1, a perspective view of a first conventional notebook computer is shown. FIG. 1 shows a notebook computer 100 including a base housing 102, a cover 104, a liquid crystal display module (LCM) 106 and an optical drive 108. Since the cover 104 is rotatably coupled to the base housing 102, the cover 104 can be opened or closed relative to the base housing 102 along an arrow 105 as shown in FIG. 1. The optical drive 108, which is provided for a user to load and play a CD, is configured in the front of the base housing 102. The LCM 106 is disposed on the front surface of the cover 104 near the optical drive 108 in order to display information of the playing CD in the optical drive 108.

While the cover 104 is secured to the base housing 102, the optical drive 108 plays the CD and the LCM 106 can display information of the playing CD in the optical drive 108. However, due to a limitation of a visual field of the LCM 106, only the user within the visual field can see the frame of the LCM 106.

FIG. 2 shows a perspective view of a second conventional notebook computer. In FIG. 2, a notebook computer 200 includes at least a base housing 202, a cover 204, a liquid crystal display module (LCM) 206 and an optical drive 208. The cover 204 is rotatably coupled to the housing 202 and can be opened or closed relative to the base housing 202 along an arrow 205 as shown in FIG. 2. The optical drive 208 is configured in the front of the base housing 202, and the LCM 206 is disposed on top surface of the cover 204 near the optical drive 208.

When the cover 204 is secured to the base housing 202, the optical drive 208 plays the CD and the LCM 206 can display information of the playing CD in the optical drive 208. However, still due to a limitation of a visual field of the LCM 206, only the user within the visual field can see the frame of the LCM 206.

FIG. 3 shows a perspective view of a third conventional notebook computer. In FIG. 3, a notebook computer 300 includes at least a base housing 302, a cover 304, a liquid crystal display module (LCM) 306 and an optical drive 308. The cover 304 is rotatably coupled to the housing 302 and can be opened and closed relative to the base housing 302 along an arrow 305 as shown in FIG. 3. The optical drive 308 is configured in the front of the base housing 302, and the LCM 306 is disposed on an inclined surface of the cover 304 near the optical drive 308.

When the cover 304 is closed relative to the base housing 302, the optical drive 308 can be used to play a CD, and the LCM 306 can display information of the playing CD in the optical drive 308. However, still due to a limitation of a visual field of the LCM 306, only the user within the visual field can see the frame of the LCM 306.

Therefore, the user beyond the visual field of the LCM 106, 206, and 306 is unable to see the frame of the LCM 106, 206, and 306. For example, the user cannot see the frame of the LCM 106 in FIG. 1 from the top view of the notebook computer 100; and the user cannot see the frame of the LCM 206 in FIG. 2 from the side view of the notebook computer 200; and also the user cannot see the frame of the LCM 306 in FIG. 3 from the top view and the side view of the notebook computer 300. Accordingly, the liquid crystal display module (LCM) of the notebook computer facing toward a single direction is not flexible and convenient for use.

SUMMARY OF THE INVENTION

It is therefore to provide a notebook computer having a rotatable display module. The invention makes use of a pivot device design for rotating a second housing around a first housing, so that a liquid crystal display module (LCM) of the second housing can face a first direction or a second direction, or even any direction therebetween. Thereby the invention increases the usage scope of the LCM.

According to an object of the invention, an electrical device having a rotatable display module, such as a notebook computer, is provided. The invention includes at least a first housing, a second housing, a display module, an elastic device, a protrusion, and a guide track. The first housing includes a sunken part having an inner front wall and an inner side wall. The second housing having a front panel and a side panel is rotatably disposed in the sunken part of the first housing between a first position and a second position. The display module is disposed on the front panel, and the elastic device is used for returning the second housing from the second position to the first position. The protrusion is slidably disposed on the side panel of the second housing, and the guide track having a first fixer and a second fixer is formed on the inner side wall of the first housing. When the second housing is rotated, the protrusion can move forward and backward between the first fixer and the second fixer along the guide track. When the protrusion is coupled to the first fixer, the second housing is located in the first position, and the display module faces a first direction. When the protrusion is coupled to the second fixer, the second housing is located in the second position, and a display module faces a second direction.

According to another object of the invention, a pivot device is provided for rotating a second housing in a sunken part of a first housing. The sunken part includes an inner front wall and an inner side wall. The second housing includes a front panel and a side panel. The pivot device includes an elastic device, a protrusion, and a guide track. The elastic device is used for returning the second housing from the second position to the first position. The protrusion is slidably disposed on the side panel of the second housing, and the guide track having a first fixer and a second fixer is formed on the inner side wall of the first housing. When the second housing is rotated, the protrusion can move forward and backward between the first fixer and the second fixer along the guide track. When the protrusion is coupled to the first fixer, the second housing is located in the first position, and the front panel of the second housing faces a first direction. When the protrusion is coupled to the second fixer, the second housing is located in the second position, and the front panel of the second housing faces a second direction.

According to another object of the invention, an electrical device, such as a notebook computer, is provided. The invention includes at least a first housing, a second housing, a display module, an elastic device, a protrusion, and a guide track. The first housing includes a sunken part having an inner front wall and an inner side wall. The second housing having a front panel and a side panel is rotatably disposed in the sunken part of the first housing between a first position and a second position. The display module is disposed on the front panel, and the elastic device is used for returning the second housing from the second position to the first position. The protrusion is slidably disposed on the inner side wall of the first housing, and the guide track having a first fixer and a second fixer is formed on the side panel of the second housing. When the second housing is rotated, the protrusion can move forward and backward between the first fixer and the second fixer along the guide track. When the protrusion is coupled to the first fixer, the second housing is located in the first position, and the display module faces a first direction. When the protrusion is coupled to the second fixer, the second housing is located in the second position, and a display module faces a second direction.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
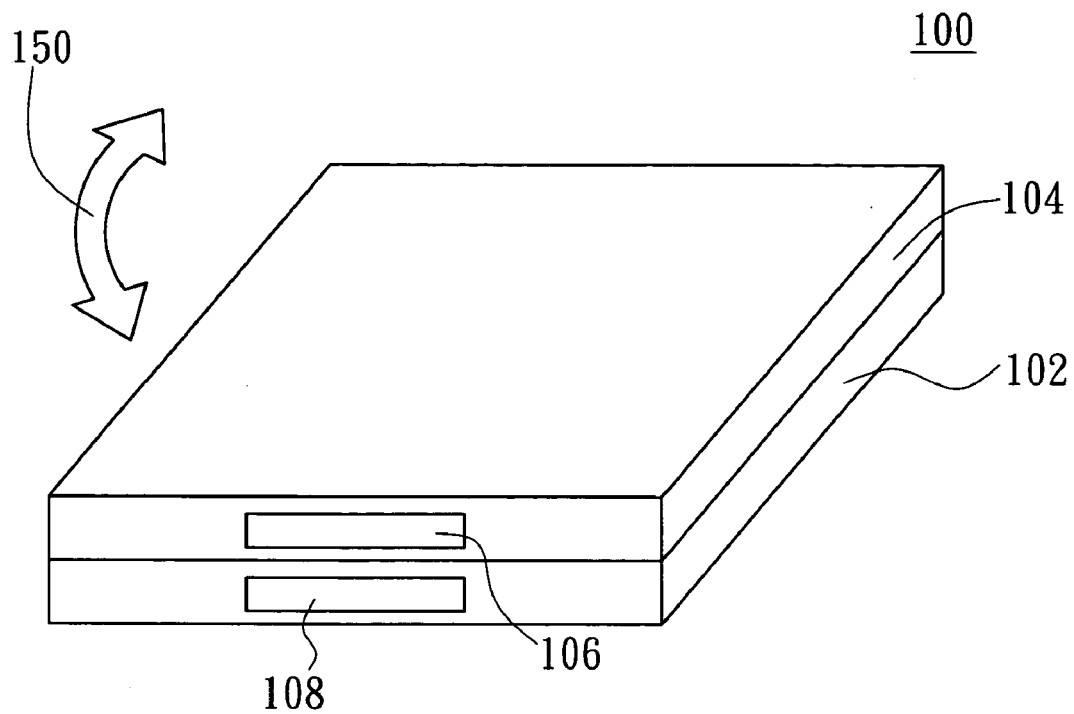
FIG. 1 (Prior Art) shows a perspective view of a first conventional notebook computer.
Figure 2:
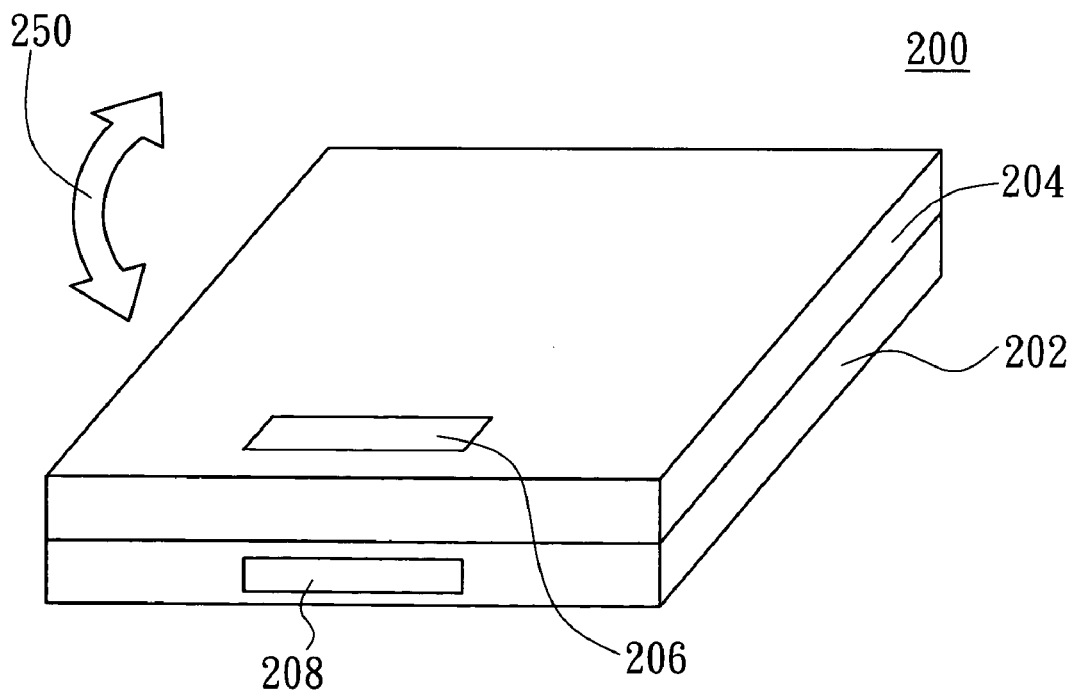
FIG. 2 (Prior Art) shows a perspective view of a second conventional notebook computer.
Figure 3:
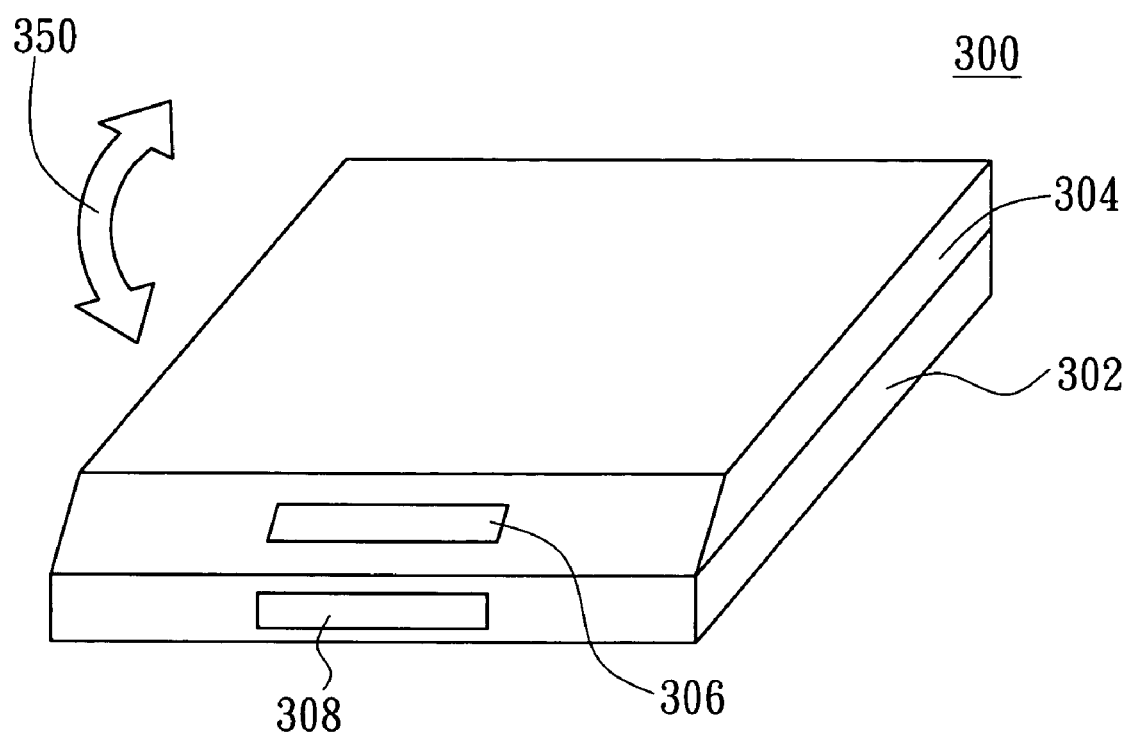
FIG. 3 (Prior Art) shows a perspective view of a third conventional notebook computer.
Figure 4A:
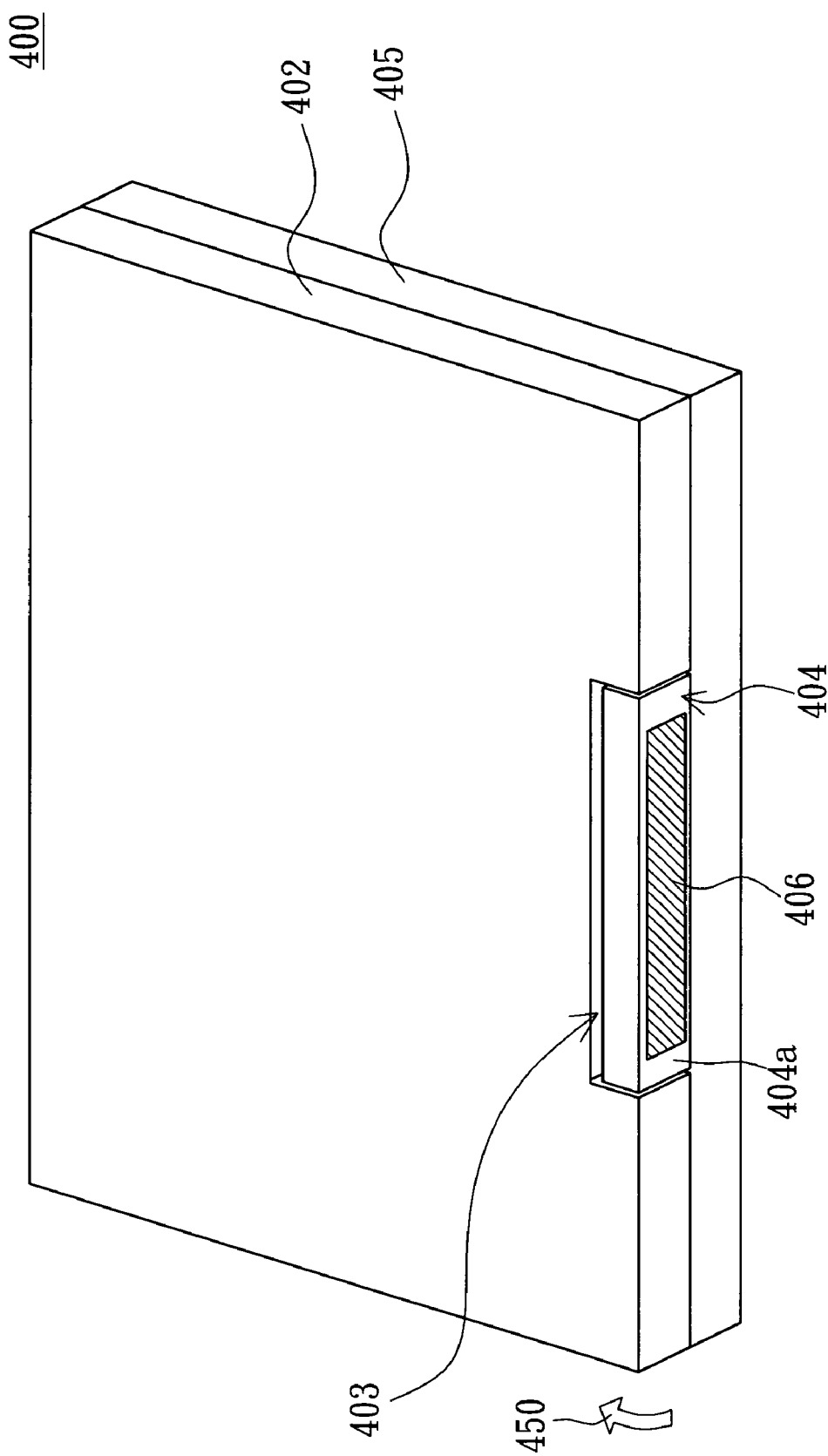
FIG. 4A illustrates a structural diagram of a notebook computer having a rotatable display module according to a preferred embodiment of the invention.

FIG. 4A illustrates a structural diagram of a notebook computer having a rotatable display module according to a preferred embodiment of the invention. In FIG. 4A, a notebook computer 400 includes at least a base housing 405, and a cover. The cover further includes a first housing 402, a second housing 404, and a display module 406. The first housing 402 is disposed on the second housing 405 and can be opened and closed relative to the second housing. The first housing 402 includes a sunken part 403. The second housing 404 is rotatably disposed in the sunken part 403 between a first position and a second position. The second housing 404 includes a front panel 404a, and the display module 406 is disposed on the front panel 404a. Similarly, the sunken part can be designed in the base housing so that the second casing with a display module can be rotatably disposed in the front of the base housing 405 without further description.

In addition, the invention especially has a pivot device for connecting a first housing 402 and a second housing 404, so that the second housing 404 can rotate forward and backward along an arrow 450 in FIG. 4A while the second housing 404 is configured to the base housing 405. Therefore, the display module 406 will be able to face the front or top of the notebook computer 400, or any other directions between so as to achieve a variation of many inclination angles.

Figure 4B:
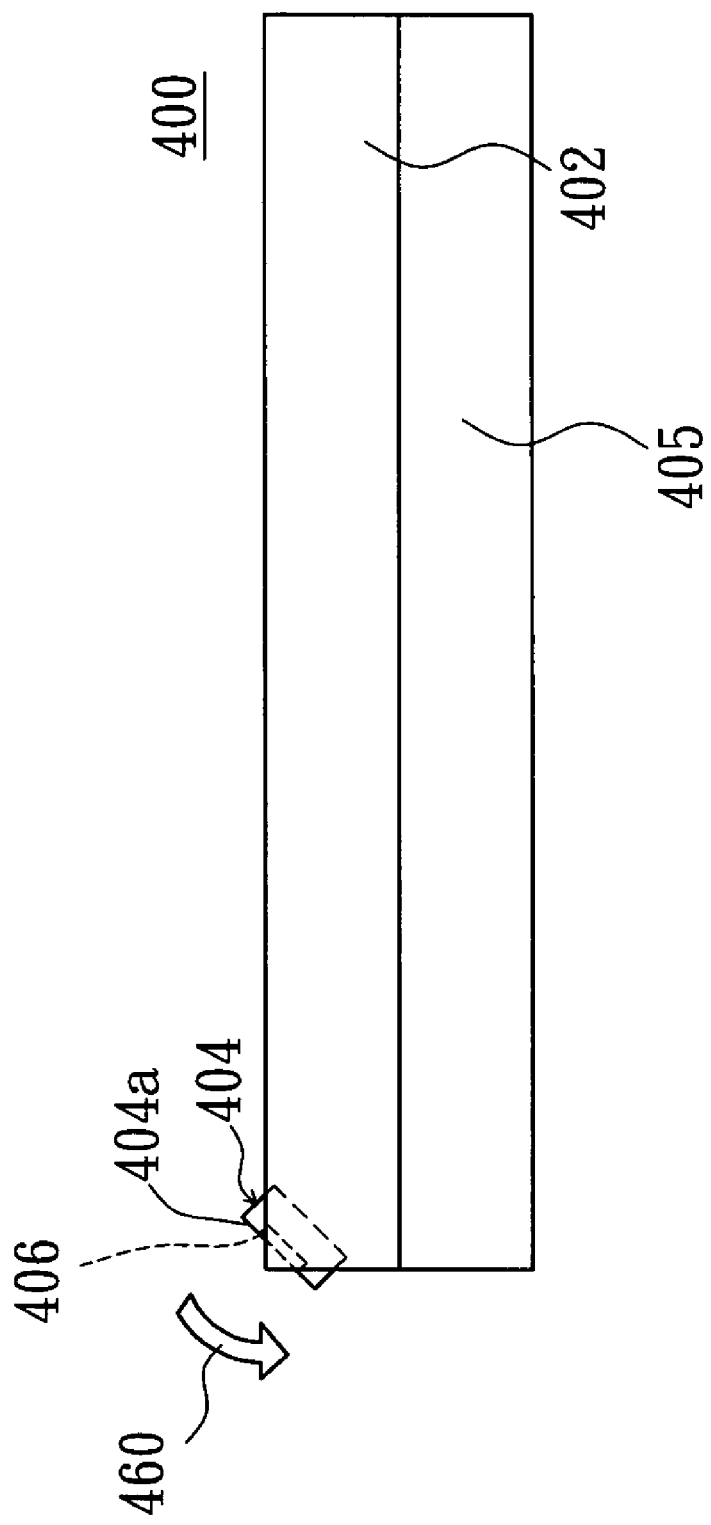
FIG. 4B illustrates a lateral view of the display module in FIG. 4A.

In FIG. 4A, when the second housing 404 is in the first position, the display module 406 faces a first direction such as the front of the notebook computer 400. When the second housing 404 rotates an angle to the second position by means of the pivot device along the arrow 450 in FIG. 4A, the display module 406 faces the second direction such as a direction between the front and the top of the notebook computer 400 as shown in FIG. 4B. Meanwhile, the pivot device produces a reverse twist force by rotation. Referring to FIG. 4B, the second housing 404 also rotates along an arrow 460 of the FIG. 4B by the reverse twist force of the pivot device and returns to the first position as shown in FIG. 4A. In this way, the usage scope of the display module 460 is much more flexible, so as to get rid of the conventional shortcoming of only facing a single direction of the notebook computer.

With regard to a structure that how the pivot device of the present invention connects with the first housing 402 and the second housing 404 and also how the pivot device of the present invention enables the second housing 404 to rotate will be described with reference to the accompanying drawings as follows.

Figure 5A:
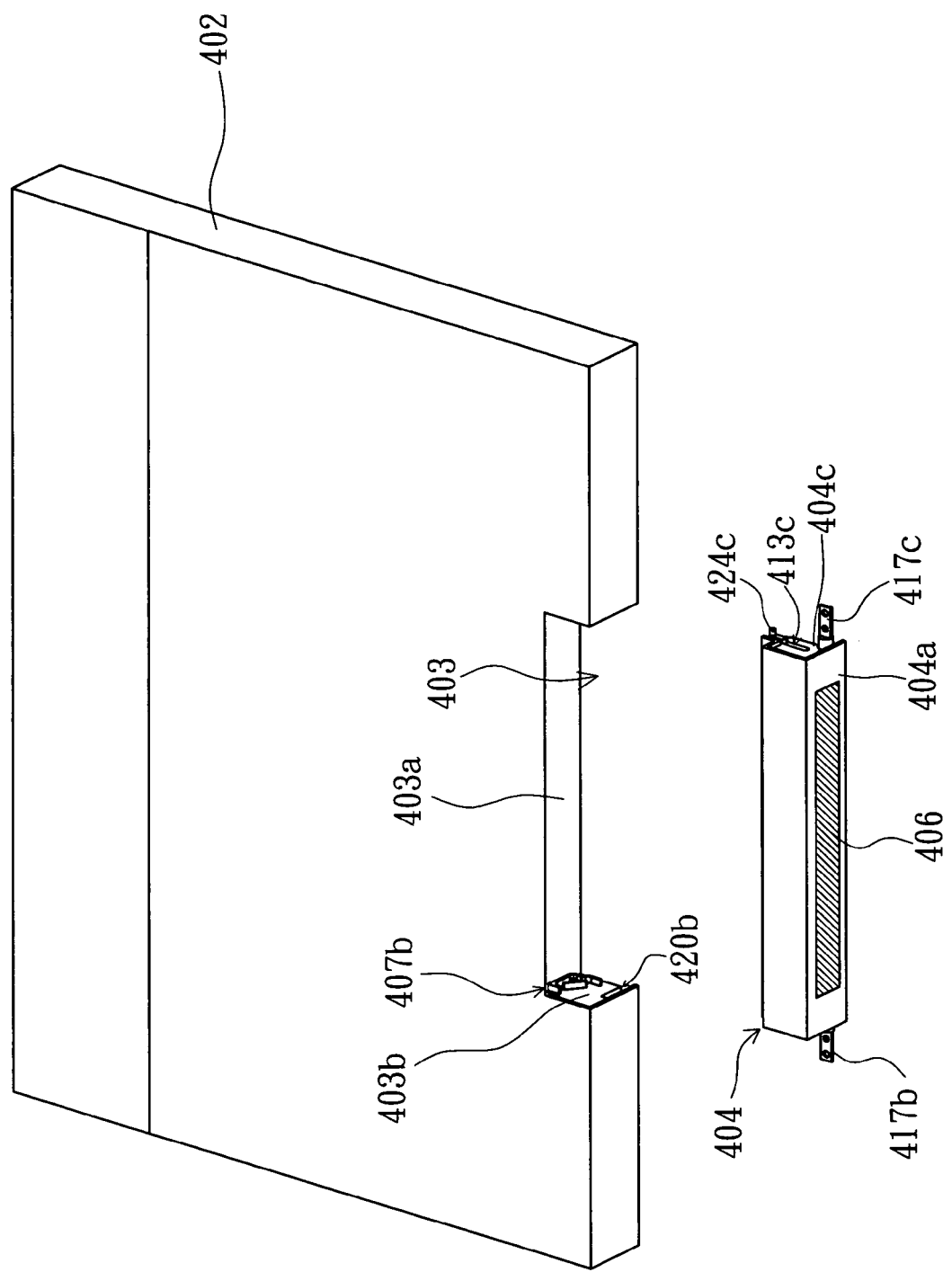
FIG. 5A illustrates an exploded view of the first housing and the second housing in FIG. 4A.
Figure 5B:
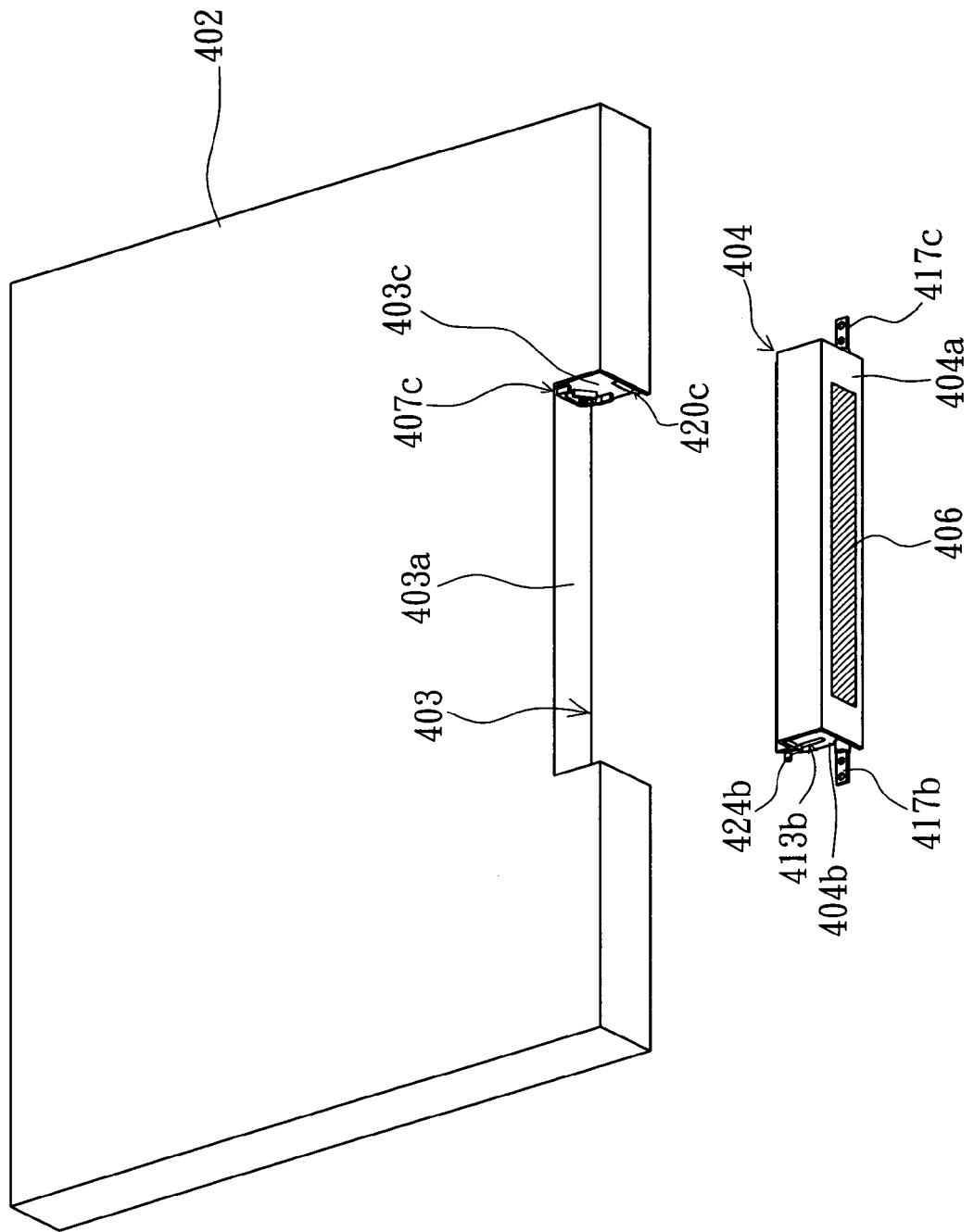
FIG. 5B illustrates another exploded view of the first housing and the second housing in FIG. 4A.

Referring to FIGS. 5A and 5B, two exploded view of the first housing and the second housing in FIG. 4A are shown. The sunken part 403 includes an inner front wall 403a and two opposite inner side walls 403b and 403c. The second housing 404 includes two opposite side panels 404b and 404c. The side panels 404b and 404c are parallel with each other and perpendicularly adjoin to two ends of the front panel 404a.

Referring to FIG. 5A, an end of the second housing 404 includes a fixed bolt 417c, a groove 413c, and a protrusion 424c, which form parts of structures of the pivot device according to the invention. The fixed bolt 417c protrudes from the side panel 404c of the second housing. The groove 413c is formed on the side panels 404c and extends along a direction parallel to the normal direction of the front panel 404a. The protrusion 424c protrudes from the side panel 404c of the second housing and is able to slide backward and forward along the groove 413c. Similarly, in FIG. 5B, the other end of the second housing 404 includes a fixed bolt 417b, a groove 413b, and a protrusion 424b, which also form parts of structures of the pivot device according to the invention. The fixed bolt 417b protrudes from the side panel 404b of the second housing. The groove 413b is formed on the side panel 404b and extends along a direction parallel to the normal direction of the front panel 404a. The protrusion 424b protrudes from the side panel 404b of the second housing, and is able to slide backward and forward along the groove 413b.

The inner side wall 403b of the sunken part of the first housing includes a gap 420b and a guide track 407b as shown in FIG. 5A. The guide track 407b disposed on the inner side wall 403b of the first housing for guiding the protrusion 424b in FIG. 5B to slide while the second housing 404 rotates. The gap 420b is for receiving and connecting the fixed bolt 417b. Similarly, the inner side wall 403c of the first housing includes a gap 420c and a guide track 407c as shown in FIG. 5B. The guide track 407c disposed on the inner side wall 403c of the first housing for guiding the protrusion 424c in FIG. 5A to slide while the second housing 404 rotates. The gap 420c is for receiving and connecting the fixed bolt 417c, so that the first housing 402 and the second housing 404 are connected together and be able to rotate as shown in FIG. 4A also.

Figure 6A:
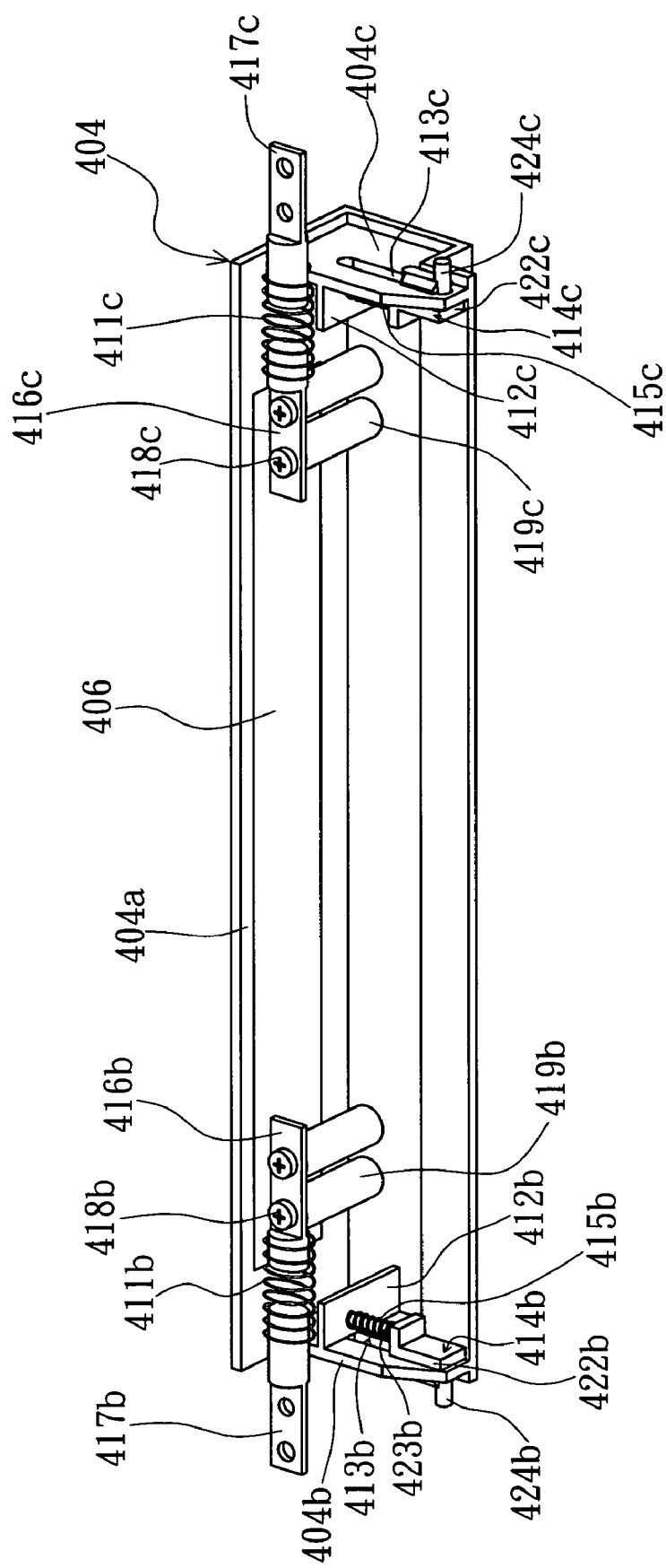
FIG. 6A shows a perspective view of the second housing in FIG. 5A.
Figure 6B:
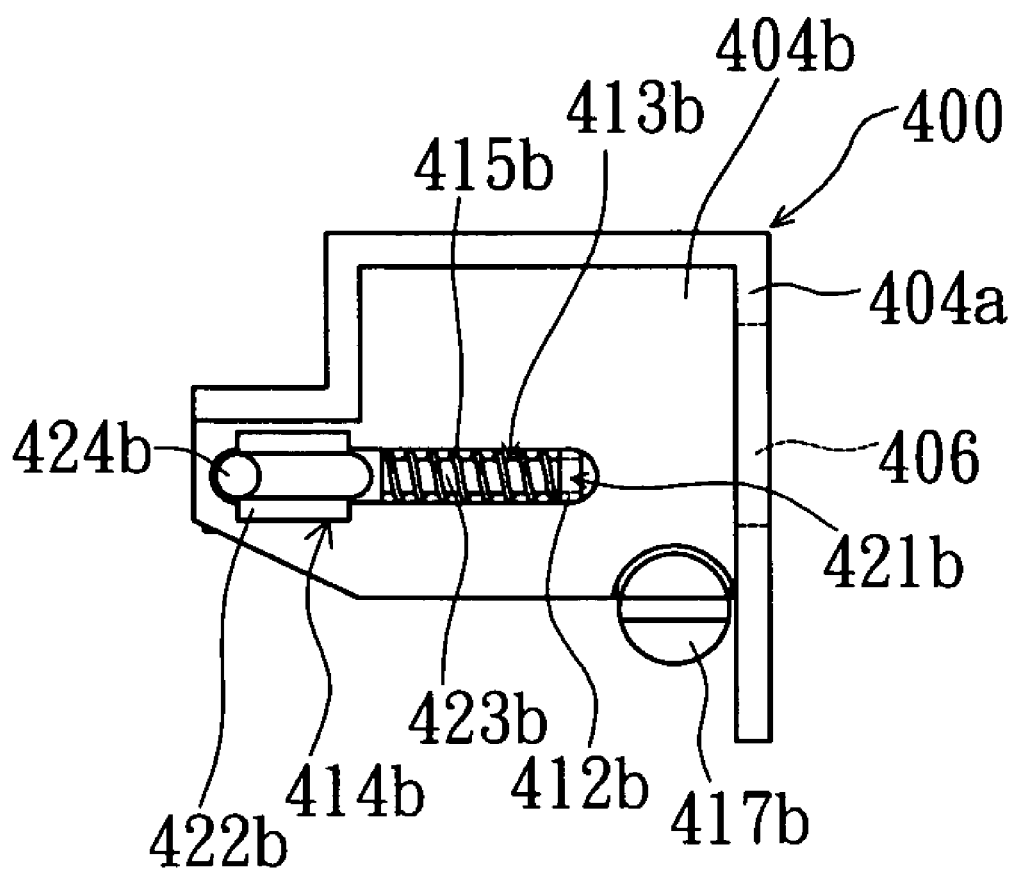
FIG. 6B shows a lateral view of the second housing in FIG. 5A.
Figure 6C:
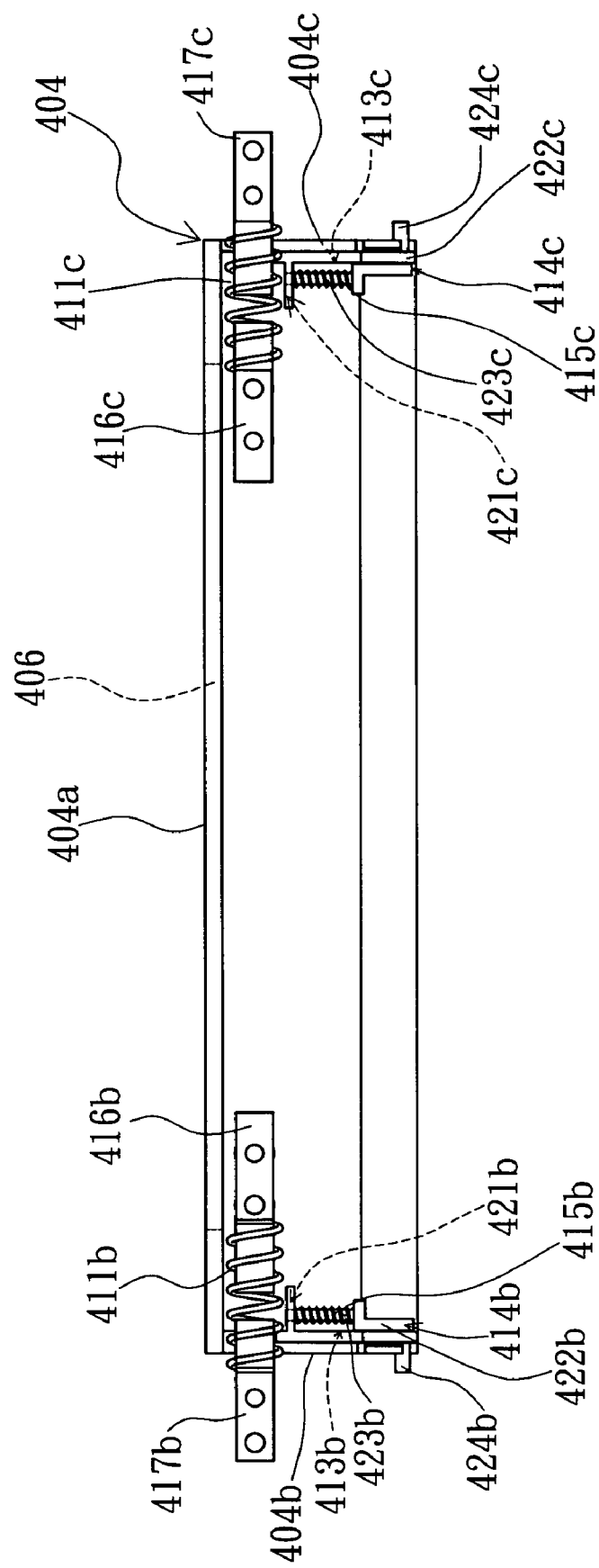
FIG. 6C shows a top view of the second housing in FIG. 6A.
Figure 6D:
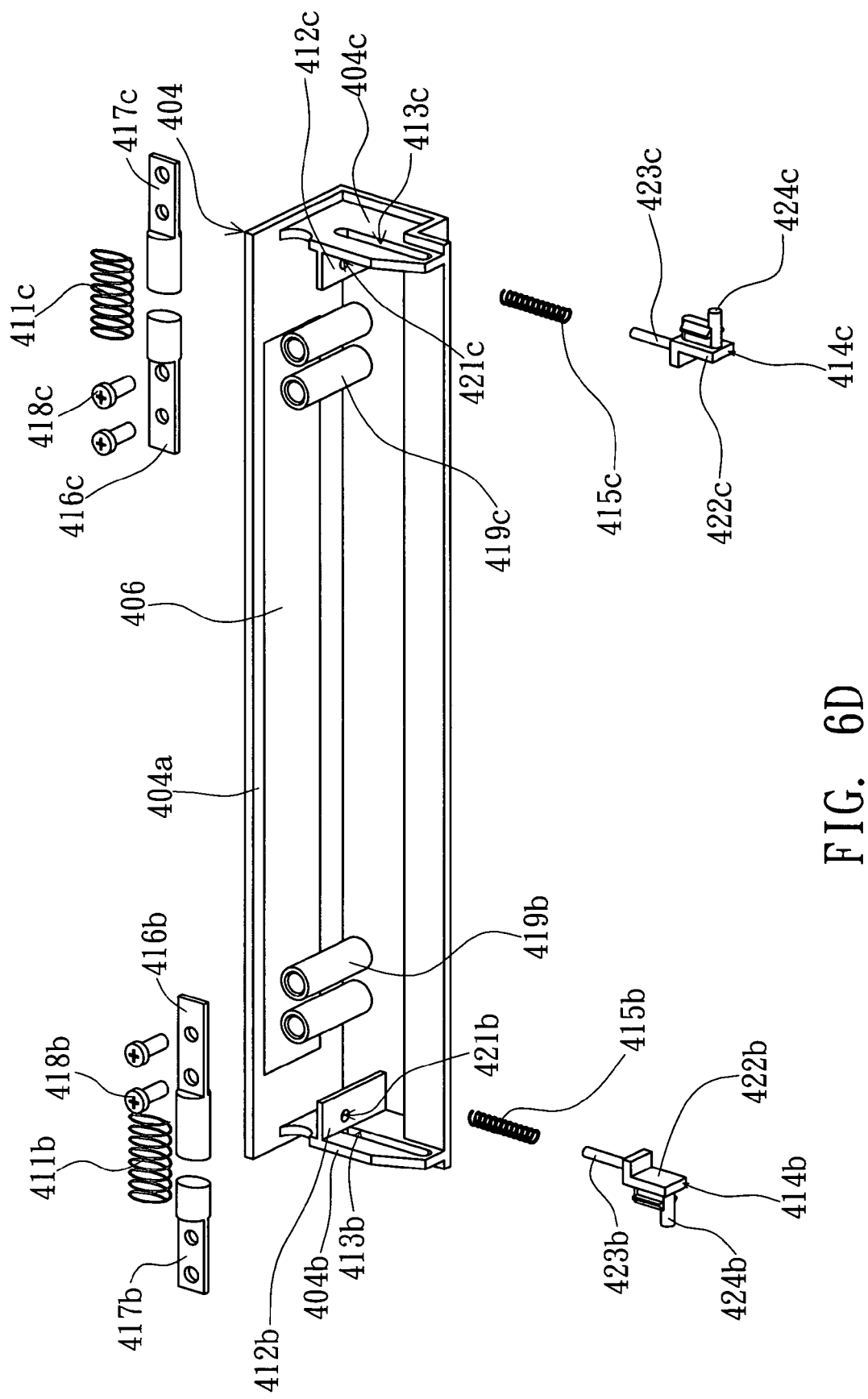
FIG. 6D shows an exploded view of the second housing in FIG. 6A.

In order to understand the structure of the pivot device according to the invention, please refer to FIGS. 6A~6D simultaneously. FIG. 6A shows a perspective view of the second housing in FIG. 5A, and FIG. 6B shows a lateral view of the second housing in FIG. 5A. FIG. 6C shows a top view of the second housing in FIG. 6A, and FIG. 6D shows an exploded view of the second housing of FIG. 6A. The pivot device according to the invention further includes axial springs 411b and 411c, extending parts 412b and 412c, slides 414b and 414c, and elastic springs 415b and 415c.

One end of the axial springs 411b is connected to the fixed bolt 416b, and the fixed bolt 416b is fixed to two fixing pillars 419b inside the second housing 404 by two screws 418b. The two fixing pillars 419b are near the front panel 404a and the side panel 404b of the housing. The other end of the axial springs 411b is connected to the fixed bolt 417b, and part of the fixed bolt 417b is stretched out from the side panel 404b of the housing, and also is connected to the gap 420b in FIG. 5A. Similarly, one end of the axial springs 411c is connected to the fixed bolt 416c, and the fixed bolt 416c is fixed to two fixing pillars 419c inside the second housing 404 by two screws 418c. The two fixing pillars 419c are near the front-panel 404a and the side panel 404c of the housing. The other end of the axial springs 411c is connected to the fixed bolt 417c, and the fixed bolt 417c is stretched out from the side panel 404c of the housing, and also is connected to the gap 420c in FIG. 5B. Therefore, when the first housing 402 and the second housing 404 are connected together, the axial springs 411b and 411c are provided as axles when the second housing 404 rotates opposite to the first housing 402. Besides, a reverse twist is produced by the axial springs 411b and 411c while the rotation angle increases. The reverse twist can return the second housing 404 from the second position to the first position.

What needed to pay attention is that the invention also can directly use axial springs 411b and 411c to connect the first housing 402 and the second housing 404. In this way, it also can achieve the object of having the second housing 404 rotate over the first housing 402.

The extending parts 412b and 412c are disposed at the inner front walls of the side panels 404b and 404c of the housing respectively, and also vertically connected with the side panels 404b and 404c of the housing respectively. The extending parts 412b and 412c include apertures 421b and 421c facing the front panel 404a of the first housing 402, as shown in FIG. 6C and FIG. 6D. The slides 414b and 414c are slidably disposed in the grooves 413b and 413c respectively. The slide 414b includes a body 422b, a stick 423b, and the protrusion 424c. The bodies 422b and 422c are slidably imbedded in the grooves 413b and 413c, so as to avoid the slides 414b and 414c fall off the second housing 404 when sliding. One end of the sticks 423b and 423c are connected with the bodies 422b and 422c respectively, and the other ends of the sticks 423b and 423c insert into the apertures 421b and 421c, so that the sticks 423b and 423c pass through apertures 421b and 421c according to the sliding of the bodies 422b and 422c. One end of the protrusions 424b and 424c penetrate the grooves 413b and 413c, and also are connected with the bodies 422b and 422c respectively. The other end of the protrusions 424b and 424c are stretched out from the side panels 404b and 404c of the housing respectively.

The sticks 423b and 423c pass through the elastic springs 415b and 415c. The first ends of the elastic springs 415b and 415c are connected with the extending parts 412b and 412c respectively, and the second ends of the elastic springs 415b and 415c are connected with the bodies 422b and 422c respectively. The elastic springs 415b and 415c are compressed for producing elasticity while the slides 414b and 414c move toward the extending parts 412b and 412c respectively.

Figure 7:
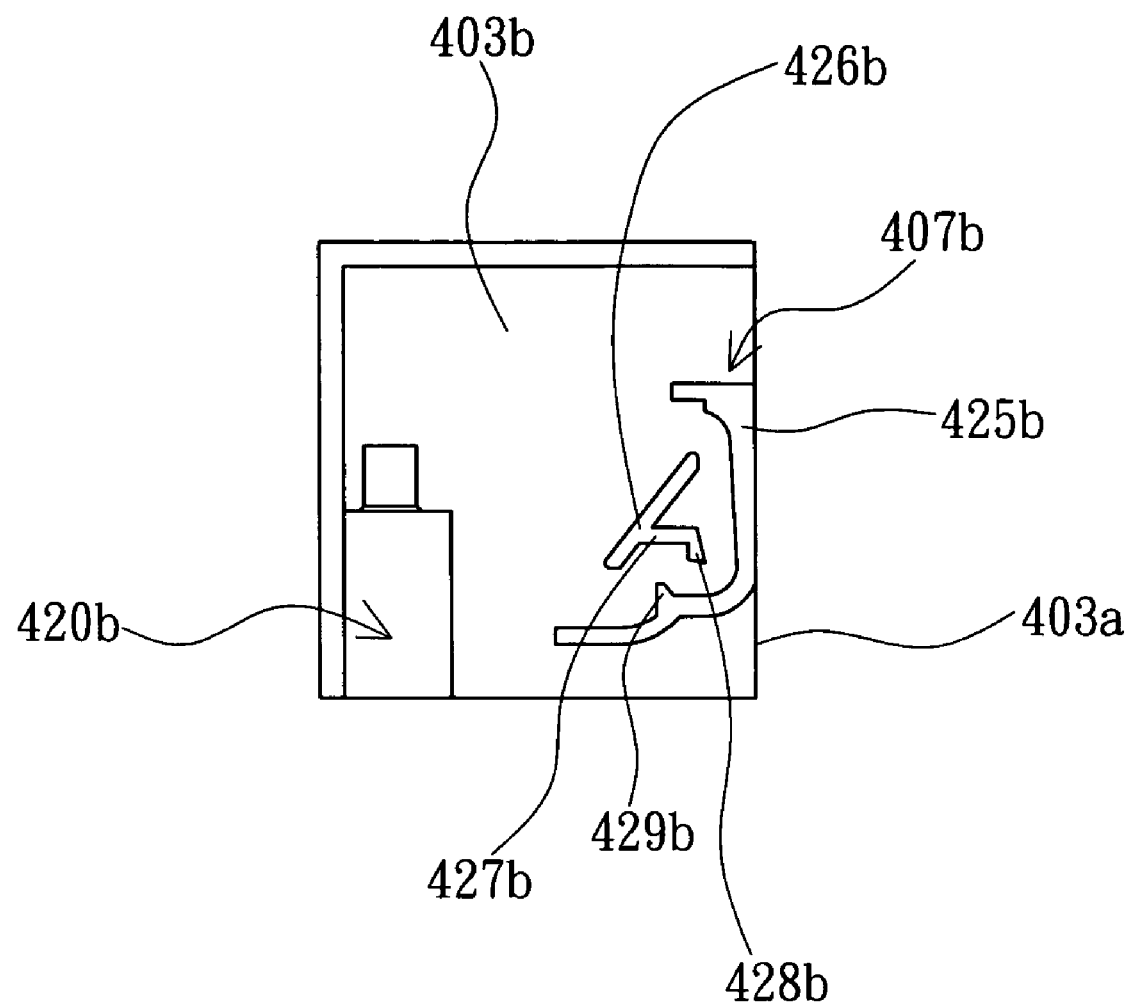
FIG. 7 shows a schematic view of the inner side wall of the sunken part in FIG. 5A.

FIG. 7 shows a schematic view of the inner side walls 403b of the sunken part 403 in FIG. 5A. In FIG. 7, the guide track 407b includes an arc track 425b, a slope track 426b, and a bar track 427b. The arc track 425b is partly adjacent to the inner front wall 403a and has an indentation toward the front of the inner front walls 403a. The slope track 426b is disposed in the indentation of the arc track 425b and has an upper end and lower end. The slope track 426b is located below the upper end of the arc track 425b. In addition, the lower end of the slope track 426b of the inner front walls 403a is farther than the upper end of the slope track 426b. When the second housing 404 is located at the first position and the display module faces the first direction, for example the front of the notebook computer 400 as shown in FIG. 4A, the normal direction of the surface of the front panel 404a is parallel to the inner side wall 403b, and also the upper end of the arc track 425b holds the protrusion 424b. The upper end of the arc track 425b can be regarded as the first fixer of the guide track 407b. In addition, the inner peripheral of the upper of the arc track 425b includes a breach for enhancing the holding effect to the protrusion 424b. The bar track 427b is located between the slope track 426b and the arc track 425b. One end of the bar track 427b is connected with the lower end of the slope track 426b, and the other end of the bar track 427b includes a second fixer 428b. Besides, the lower end of the arc track 425b includes an above protruding structure 429b in corresponding to the second fixer 428b for the second fixer 428b to hold the protrusion 424b. When the protrusion 424b is held by the second fixer, the normal direction of the surface of the front panel 404a and the surface of the inner side wall 403b form an oblique angle, and the second housing 404 locates at the second position and the display module 406 faces a direction between the front and top of the notebook computer 400. Further, the structure of the guide track 407c is symmetrical to the guide track 407b.

Figure 8A:
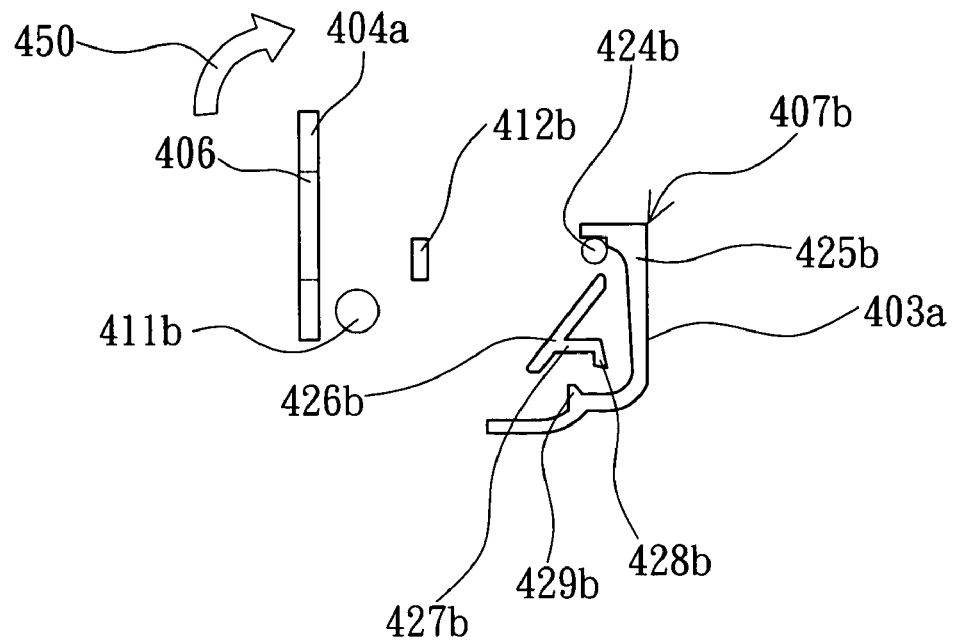
FIG. 8A to 8E are cross-sectional views showing the moving process of the protrusion and the guide track according to the preferred embodiment of the invention.

When the second housing 404 is connected with the first housing 402 by the pivot device according to the invention, the normal direction of the surface of the front panel 404a of the housing is parallel to the inner side wall 403b. That is the second housing 404 located in the first position. The display module 406 faces the first direction, for example the front of the notebook computer 400 as in FIG. 4A, the first fixers of the guide tracks 407b and 407c hold the protrusions 424b and 424c respectively. The protrusion 424b and the guide track 407b as shown in FIG. 8A will be taken for example. Due to the elasticity of the elastic spring 415b in FIG. 6A, the protrusion 424b can be held by the first fixer formed by the upper end of the arc track 425b.

Figure 8B:
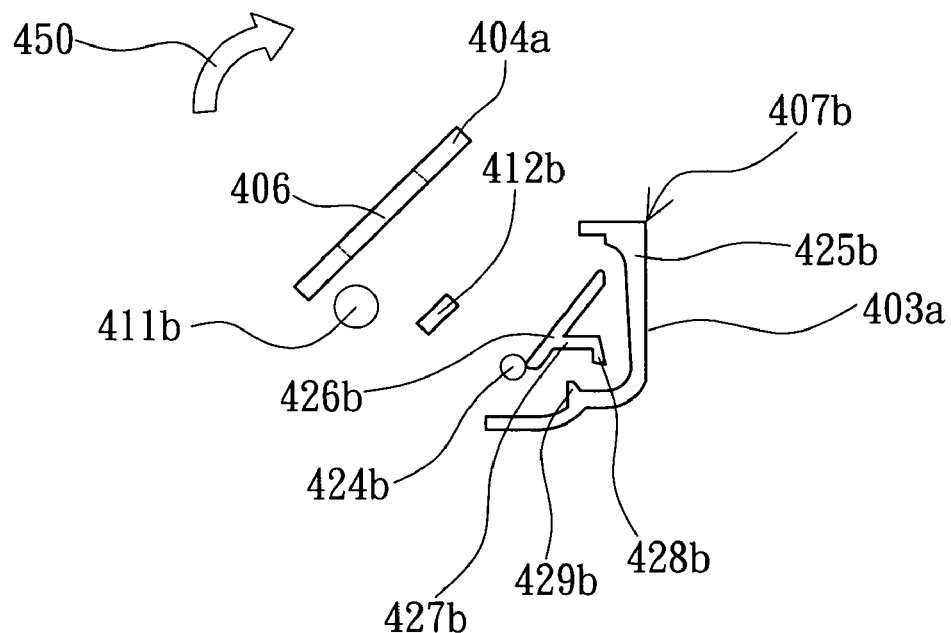

When a user wants to adjust the LCM module 406 to face the second direction, for example as shown in FIG. 4B facing the direction between the front and top of the notebook computer 400, the user can push the front panel 404a of the housing, so that the front late 404a of the housing rotates by an axle center of the axial spring 411b along a direction of the arrow 450 in FIG. 8A. At this time the top end of the protrusion 424b is connected to the top end of the arc track 425b, and will slide down along the slope track 426b to the bottom of the arc track 426b as shown in FIG. 8B. Referring to FIG. 8, when the protrusion 424b is held by the slope track 426b, a distance between the extending part 412b and the protrusion 424b becomes shorter. It represents that the elastic spring 415b in FIG. 6A has been compressed and produced an elasticity force, and the axial spring 411b is twisted and produced a reverse twist force.

Figure 8C:
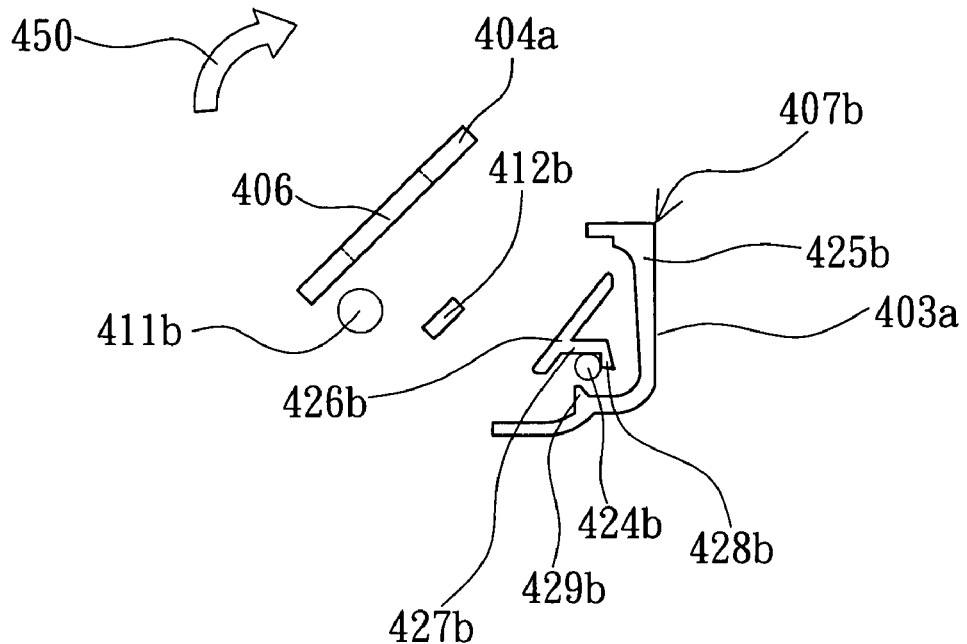

When the user continues to rotate the front panel 404a of the housing as shown in FIG. 8B, as soon as the protrusion 424b is departed from the bottom of the slope track 426b, the reverse twist force of the axial spring 411b and the elasticity of the elastic spring 415b will compel the protrusion 423b to hit the bar track 427b. The protrusion 423b will also be held by the second fixer 428b as shown in FIG. 8C. Referring to FIG. 8C, the normal direction of the surface of the front panel 404a of the housing and the normal direction of the surface of the inner front wall 403a form an oblique angle, so that the display module 406 faces the second direction as shown in FIG. 4B.

Figure 8D:
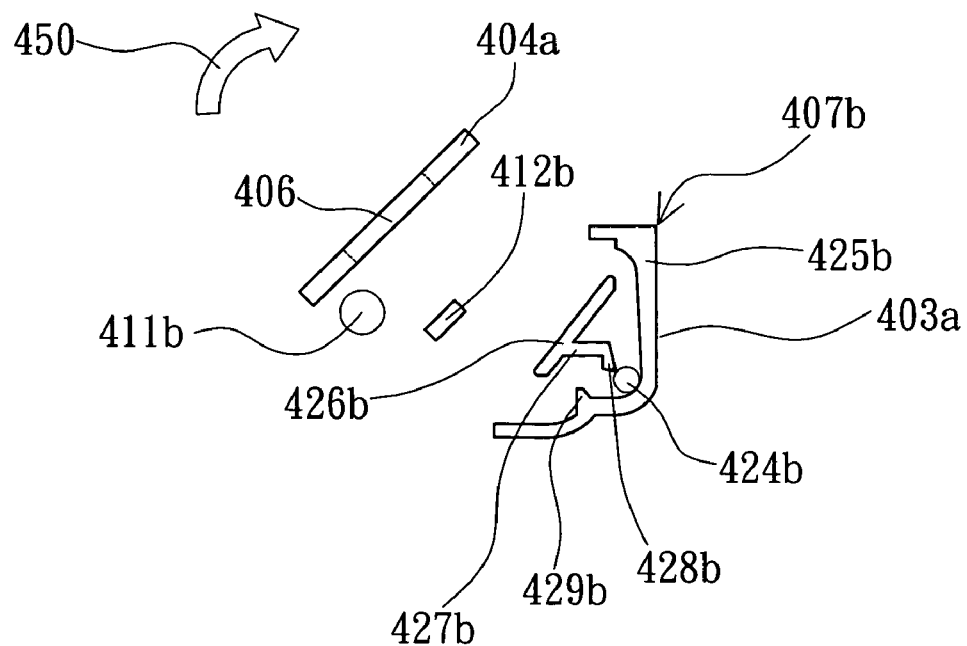
Figure 8E:
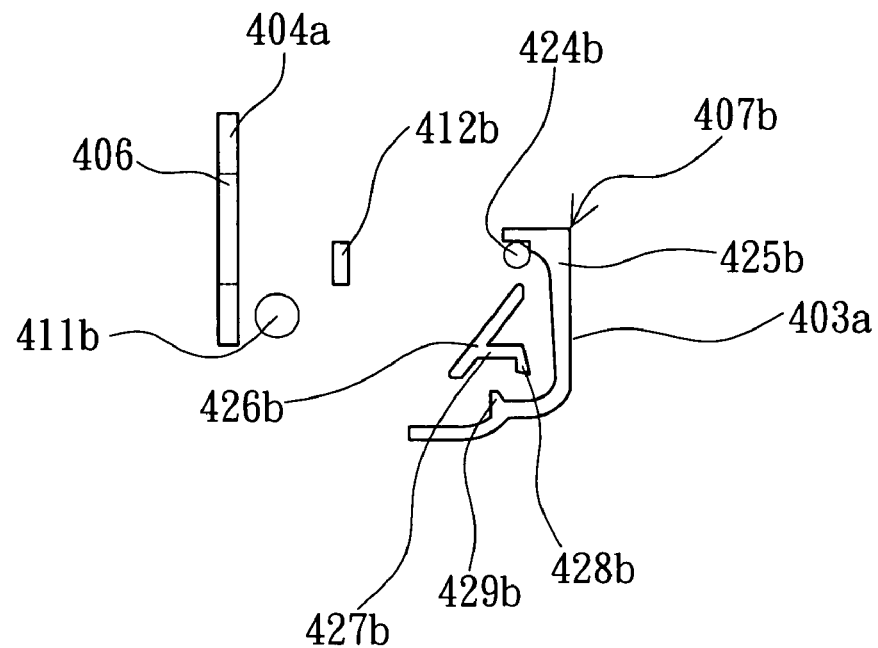

When the user slightly rotates the front panel 404a of the housing along an arrow 450 in FIG. 8C for a small angle and then release, the reverse twist force of the axial spring 411b and the elasticity of the elastic spring 415b will compel the protrusion 424b to depart from the second fixer 428b, and the protrusion 424b will touch the lower end of the arc track 425b as shown in FIG. 8D. Sequentially, the protrusion 424b continues to slide to the upper end of the arc track 425b, which goes back to the original position, as shown in FIG. 8E. Referring to FIG. 8E, the normal direction of the surface of the front panel 404a of the housing is parallel to the normal direction of the surface of the inner front wall 403a, so that the display module 406 faces the first direction as shown in FIG. 4A.

Therefore, when the second housing 404 is rotated, by the axial springs 411a and 411c to function with elastic springs 415b and 415c respectively, the protrusions 424b and 424c can move forward and backward between the first fixer and the second fixer along the guide tracks 407b and 407c. The protrusions 424b and 424c can be fixed at the positions of the first fixer or the second fixer, so that the front panel 404a of the housing locates at the first position facing the first direction or at the second position facing the second direction. What required to take notice is that the invention also can use other method of the elastic device to make the second housing 404 rotate and recover from the second position to the first position.

Figure 9:
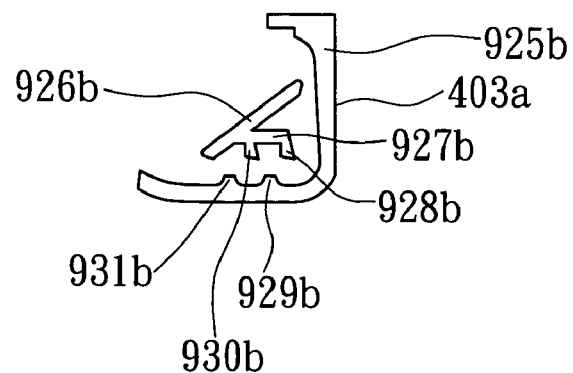
FIG. 9 shows the guide track having two second fixers according to the preferred embodiment of the invention.

In order to increase the variation of oblique angles which results from the rotation of the second housing 404, the invention can adjust the structure of the arc track of the inner side walls 403b and 403c as shown in FIG. 9. Referring to FIG. 9, the guide track 907b includes an arc track 925b, a slope track 926b, and a bar track 927b. The arc track 925b is partly adjacent to the inner front wall 403a and has an indentation toward the front of the inner front walls 403a. The slope track 926b is inclined and disposed in the indentation of the arc track 425b, and the upper end of the slope track 926b is located below the upper end of the arc track 925b. In addition, the lower end of the slope track 926b of the inner front walls 403a is farther than the upper end of the slope track 926b. The bar track 927b is located between the slope track 926b and the arc track 925b, and one end of the bar track 927b is connected with the lower end of the slope track 926b. The bar track 927b includes second fixers 928b and 930b, with the second fixer 928b located at the other end of the bar track 927b, and the second fixer 930b located between the bottom end of the slope track 926b and the second fixer 928b. Besides, the lower end of the arc track 925b includes above protruding structures 929b and 931b for the second fixers 928b and 931b respectively to enhance the holding effect to the protrusion 424b. When the protrusion 924b is held by the second fixers 928b and 931b, the normal direction of the surface of the front panel 404a and the surface of the inner side wall 403b form an oblique angle. Thus, the display module 406 faces any direction between the front and top of the notebook computer 400.

In addition, in a premise of complying with the display module 406 being able to be adjusted to different inclination angles, the invention can omit the structures disposed at one end of the second housing 404 including the axial spring, the slide, the groove, and the elastic spring, etc. Conversely, the invention also can omit the guide track formed on the inner front wall of the first housing 402. Naturally the end of the second housing 404 also can be connected with the inner front wall to rotate by a general pivot structure like a pivot bolt and a pivot aperture.

Further, according to the invention, the structures of the axial spring, the slide, the groove, and the elastic spring can be disposed to at least one inner side wall of the first housing 402. Relatively, according to the invention, the guide track will be disposed to at least one side panel of the second housing 404. The groove is disposed at the inner side wall. The slide having a protrusion is slidable disposed in the groove. One end of the elastic spring device is fixed to the first housing, and the other end of the elastic spring device is connected to the slide. In addition, the arc track is partly adjacent to the front panel of the second housing has an indentation toward the front panel of the second housing. The lower end of the slope track is farther than the upper end of the slope track of the front panel of the housing. In this way, the invention still can achieve the object of adjusting the display module 406 to different inclination angles.

However anyone who is familiar with the craft of the invention also can understand that the technique of the invention is not limited thereto. For example, the first housing 402 is usually the base housing or the cover, the display module 406 can be a liquid crystal display module (LCM). In addition, when the display module face a certain direction between the first and second directions of the notebook computer at the beginning, the display module can be adjusted to change its direction by the designed pivot device. The axial spring of the invention can be an axial elastic device, and the elastic spring can be an elastic spring device. Furthermore, the pivot device of the invention can be used in other electronic devices.

The above-mentioned embodiment as disclosed in the present invention having a rotatable display module of the notebook computer utilizes the pivot device so as to achieve the design of having the second housing rotate relative to the first housing. Therefore, the display module of the second housing faces the first direction or the second direction, for example the front or the top of the notebook computer, and even the variation of many inclination angles, so as to increase the usage scope of the display module.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An electronic device having a rotatable display module comprising:
    a first housing having a sunken part, wherein the sunken part includes an inner front wall and an inner side wall;
    a second housing having a front panel and a side panel, rotatably disposed in the sunken part between a first position and a second position;
    a display module disposed on the front panel;
    an elastic device for returning the second housing from the second position to the first position;
    a protrusion slidably disposed on the side panel of the second housing;
    a guide track disposed on the inner side wall of the first housing, wherein the guide track includes a first fixer and a second fixer, and wherein when the second housing is rotated, the protrusion moves between the first fixer and the second fixer along the guide track;
    a groove formed on the side panel of the second housing;
    a slide having the protrusion and movably disposed in the groove;
    an elastic spring device, one end of which is fixed to the second housing, and the other end of which is connected to the slide; and
    an extending part vertically and internally disposed on the side panel, wherein the extending part has an aperture facing the front panel, and wherein the extending part is connected with the elastic spring device;
    wherein when the protrusion is coupled to the first fixer, the second housing is located in the first position, and the display module faces a first direction, and wherein when the protrusion is coupled to the second fixer, the second housing is located in the second position, and the display module faces a second direction.

2. The electronic device according to claim 1, wherein the slide further comprises:
    a body slidably imbedded in the groove and coupled with the protrusion; and
    a stick, one end of which is connected to the body, and the other end of which penetrates into the aperture.

3. An electronic device having a rotatable display module comprising:
    a first housing having a sunken part, wherein the sunken part includes an inner front wall and an inner side wall;
    a second housing having a front panel and a side panel, rotatably disposed in the sunken part between a first position and a second position;
    a display module disposed on the front panel;
    an elastic device for returning the second housing from the second position to the first position;
    a protrusion slidably disposed on the side panel of the second housing;
    a guide track disposed on the inner side wall of the first housing, wherein the guide track includes a first fixer and a second fixer, and wherein when the second housing is rotated, the protrusion moves between the first fixer and the second fixer along the guide track, the guide track comprising:
        an arc track partly adjacent to the inner front wall of the first housing and having an indentation toward the front of the inner front wall;
        an slope track disposed in the indentation of the arc track and having an upper end and a lower end, wherein the upper end of the slope track is below an upper end of the arc track and inclined to the inner front wall, and wherein the upper end of the arc track defines the first fixer; and
        a bar track located between the slope track and the arc track, wherein one end of the bar track is connected with the lower end of the slope track, and the other end of the bar track defines the second fixer;
    wherein when the protrusion is coupled to the first fixer, the second housing is located in the first position, and the display module faces a first direction, and wherein when the protrusion is coupled to the second fixer, the second housing is located in the second position, and the display module faces a second direction.

4. The electronic device according to claim 3, wherein the bar track further comprises another second fixer, wherein the another second fixer is located between the bottom end of the slope track and the second fixer.

5. A pivot device for rotating a second housing in a sunken part, wherein the sunken part includes an inner front wall and an inner side wall, wherein the second housing includes a front panel and a side panel, wherein the pivot device further comprises:
    an elastic device for returning the second housing from a second position to a first position;
    a protrusion slidably disposed on the side panel; and
    a guide track disposed on the inner side wall, wherein the guide track includes a first fixer and a second fixer, and wherein when the second housing is rotated, the protrusion moves between the first fixer and the second fixer along the guide track;
    a groove formed on the side panel;
    a slide having the protrusion and movably disposed in the groove;
    an elastic spring device, one end of which is fixed to the second housing, and the other end of which is connected to the slide; and
    an extending part vertically disposed on the side panel, wherein the extending part has an aperture facing the front panel, and wherein the extending part is connected with the elastic spring device;
    wherein when the protrusion is coupled to the first fixer, the second housing is located in the first position, and the front panel faces a first direction, and wherein when the protrusion is coupled to the second fixer, the second housing is located in the second position, and the front panel faces a second direction.

6. The pivot device according to claim 5, wherein the slide further comprises:
    a body inserted in the groove and wherein the body is coupled with the protrusion; and
    a stick, one end of which is connected to the body and the other end of which penetrates into the aperture.

7. A pivot device for rotating a second housing in a sunken part, wherein the sunken part includes an inner front wall and an inner side wall, wherein the second housing includes a front panel and a side panel, wherein the guide track further comprises:
    an elastic device for returning the second housing from a second position to a first position;
    a protrusion slidably disposed on the side panel; and
    a guide track disposed on the inner side wall, wherein the guide track includes a first fixer and a second fixer, and wherein when the second housing is rotated, the protrusion moves between the first fixer and the second fixer along the guide track; the guide track comprising:

an arc track partly adjacent to the inner front wall and having an indentation toward the front of the inner front wall;

an slope track disposed in the indentation of the arc track and having an upper end and a lower end, wherein the upper end of the slope track is below the upper end of the arc track and inclined to the inner front wall, and wherein the upper end of the arc track defines the first fixer; and a bar track located between the slope track and the arc track, wherein one end of the bar track is connected with the lower end of the slope track, and the other end of the bar track defines the second fixer wherein when the protrusion is coupled to the first fixer, the second housing is located in the first position, and the front panel faces a first direction, and wherein when the protrusion is coupled to the second fixer, the second housing is located in the second position, and the front panel faces a second direction.

8. An electronic device comprising:

a first housing having a sunken part, wherein the sunken part includes an inner front wall and an inner side wall;

a second housing having a front panel and a side panel, rotatably disposed in the sunken part between a first position and a second position;

an elastic device for returning the second housing from the second position to the first position;

a protrusion slidably disposed on the inner side wall of the first housing; and a guide track disposed on the side panel of the second housing, wherein the guide track includes a first fixer and a second fixer, and wherein when the second housing is rotated, the protrusion moves between the first fixer and the second fixer along the guide track, the guide track comprising;

an arc track partly adjacent to the front panel of the second housing and having an indentation toward the front of the front panel;

an slope track disposed in the indentation of the arc track and having an upper end, wherein the upper end of the slope track is below an upper end of the arc track and inclined to the front panel, and wherein the upper end of the arc track defines the first fixer; and a bar track located between the slope track and the arc track, wherein one end of the bar track is connected with the lower end of the slope track, and the other end of the bar track defines the second fixer;

wherein when the protrusion is coupled to the first fixer, the second housing is located in the first position, and wherein when the protrusion is coupled to the second fixer, the second housing is located in the second position.

9. The electronic device according to claim 1, wherein the elastic device is an axial elastic device, wherein the axial elastic device couples the side panel and the inner side wall for forming an axle of the second housing, wherein the axial elastic device provides a force for driving the second housing to rotate from the second position to the first position after the protrusion is decoupled to the second fixer.

10. The electronic device according to claim 1, wherein the second housing includes another side panel and the sunken part includes another inner side wall, and wherein the another side panel is rotatably coupled to the another inner side wall.

11. The electronic device according to claim 1, wherein the display module is a liquid crystal display module (LCM).

12. The electronic device according to claim 3, wherein the elastic device is an axial elastic device, wherein the axial elastic device couples the side panel and the inner side wall for forming an axle of the second housing, wherein the axial elastic device provides a force for driving the second housing to rotate from the second position to the first position after the protrusion is decoupled to the second fixer.

13. The electronic device according to claim 3, wherein the electronic device further comprises:

a groove formed on the side panel of the second housing;

a slide having the protrusion and movably disposed in the groove; and an elastic spring device, one end of which is fixed to the second housing, and the other end of which is connected to the slide.

14. The electronic device according to claim 3, wherein the second housing includes another side panel and the sunken part includes another inner side wall, and wherein the another side panel is rotatably coupled to the another inner side wall.

15. The electronic device according to claim 3, wherein the display module is a liquid crystal display module (LCM).

16. The pivot device according to claim 5, wherein the elastic device is an axial elastic device, wherein the axial elastic device couples the side panel and the inner side wall for forming an axle for the second housing, wherein the axial elastic device provides a force for driving the second housing to rotate from the second position to the first position after the protrusion is decoupled to the second fixer.

17. The pivot device according to claim 5, wherein the front panel comprises a display module.

18. The pivot device according to claim 7, wherein the elastic device is an axial elastic device, wherein the axial elastic device couples the side panel and the inner side wall for forming an axle for the second housing, wherein the axial elastic device provides a force for driving the second housing to rotate from the second position to the first position after the protrusion is decoupled to the second fixer.

19. The pivot device according to claim 7, wherein the pivot device further comprises:

a groove formed on the side panel;

a slide having the protrusion and movably disposed in the groove; and an elastic spring device, one end of which is fixed to the second housing, and the other end of which is connected to the slide.

20. The pivot device according to claim 7, wherein the front panel comprises a display module.

21. The electronic device according to claim 8, wherein the elastic device is an axial elastic device, wherein the axial elastic device couples the side panel and the inner side wall for forming an axle of the second housing, wherein the axial elastic device provides a force for driving the second housing to rotate from the second position to the first position after the protrusion is decoupled to the second fixer.

22. The electronic device according to claim 8, wherein the electronic device further comprises:

a groove formed on the inner side wall of the first housing;

a slide having the protrusion and movably disposed in the groove; and an elastic spring device, one end of which is fixed to the first housing, and the other end of which is connected to the slide.

* * * * *